Aug. 15, 1967     J. S. BLACHUT ETAL     3,335,587

AUTOMATIC STRAIGHTENING MACHINE

Filed April 1, 1965     5 Sheets-Sheet 1

INVENTORS
JOSEPH S. BLACHUT
ROBERT W. DONOHOE
WILLIAM R. NEUBARTH
BY
ATTORNEY

Aug. 15, 1967

J. S. BLACHUT ETAL

3,335,587

AUTOMATIC STRAIGHTENING MACHINE

Filed April 1, 1965

INVENTORS
JOSEPH S. BLACHUT
ROBERT W. DONOHOE
BY WILLIAM R. NEUBARTH

ATTORNEY

Aug. 15, 1967    J. S. BLACHUT ETAL    3,335,587
AUTOMATIC STRAIGHTENING MACHINE
Filed April 1, 1965    5 Sheets-Sheet 3

FIG. 3

INVENTORS
JOSEPH S. BLACHUT
ROBERT W. DONOHOE
WILLIAM R. NEUBARTH
ATTORNEY

INVENTORS
JOSEPH S. BLACHUT
ROBERT W. DONOHOE
WILLIAM R. NEUBARTH

ATTORNEY

United States Patent Office 3,335,587
Patented Aug. 15, 1967

3,335,587
AUTOMATIC STRAIGHTENING MACHINE
Joseph S. Blachut, Grosse Pointe Woods, Robert W. Donohoe, Royal Oak, and William R. Neubarth, Centerline, Mich., assignors to Pioneer Engineering & Manufacturing Company, Detroit, Mich., a corporation of Michigan
Filed Apr. 1, 1965, Ser. No. 444,533
10 Claims. (Cl. 72—9)

This invention relates to a machine for gaging the axial alignment of two spaced portions of a workpiece, passing a workpiece which is in axial alignment within acceptable tolerance, correcting a workpiece which is in axial mis-alignment outside desired tolerance, and then passing a workpiece after the correction is made.

The invention may be used to gage and correct the axial alignment of two spaced portions of various structures. A welded rear axle housing is shown and described herein as a suitable example. The rear axle housing has a banjo portion intermediate its ends for encasing and holding the differential. A bearing lies at either side of the differential when installed in the banjo portion. The rear axle housing has paired tubular sleeves extending in opposite directions from the central banjo portion. The sleeves terminate in outer ends. A bearing or bearing receiving surface lies at the outer end of each sleeve. The four spaced bearings of the axle must be in axial alignment when the axle is finally assembled.

In manufacturing a structure such as a rear axle housing by welding, it is extremely difficult to produce the axle housing precisely with all four bearing positions concentric on the axis of the housing. Usually there is some mis-alignment. In the first instance it is very difficult to establish the axis. In the second instance it is very difficult then to find any error, locate its position, and determine its magnitude relative to the axis. In the event of error it then becomes necessary to "straighten" the housing. The straightening usually involves bending one portion of the axle housing relative to the other. This also is difficult in that error may occur in varying magnitude at any position and the correction must be made in the opposite direction and be of the same magnitude but oppositely directed.

With the foregoing in view, it is a primary object of the invention to provide a machine having an established axis relative to which a structure or workpiece may be gaged for axial alignment.

An object of the invention is to provide a machine wherein the machine axis is defined between the positioning and holding means on one hand and the gaging means on the other hand so that the axial alignment of two portions of a workpiece located therebetween may be determined relative to each other by establishing the relationship of each relative to the machine axis.

An object of the invention is to provide a machine having positioning and holding means for securing a first portion of a workpiece or a structure relative to the machine axis with a selected point or location on the first portion of the structure in a known relationship such as in a concentric position on the machine axis.

An object of the invention is to provide a machine having gaging means spaced from the positioning and holding means for engaging a second portion of the structure or workpiece to determine the relative axial relationship of a selected point or location of the second portion of the workpiece relative to one machine axis.

An object of the invention is to provide a machine having gaging means capable of determining the relationship of the second portion of the workpiece relative to the machine axis and passing the workpiece as within desired tolerance.

An object of the invention is to provide a machine having gaging means capable of determining the position of eccentricity of a second portion of a workpice relative to the machine axis when outside desired tolerance.

An object of the invention is to provide a machine having gaging means producing signals indicative of concentricity and eccentricity and in the event of eccentricity indicative of the location or position of maximum eccentricity.

An object of the invention is to provide a machine having bending means for bending a mis-aligned second portion of the workpiece into concentric alignment to correct the mis-alignment.

An object of the invention is to provide a machine having a rotatable head carrying the gaging means and the bending means radially of the second portion of the workpiece so that they rotate with the head to gage the second portion of the workpiece in a full circle and so that the bending means may be engaged with the workpiece at any radial position on the circle.

An object of the invention is to provide a machine having an automatic cycle so that a workpiece may be transferred into the machine, positioned and clamped, gaged, and corrected if necessary, and transferred out of the machine continuously.

An object of the invention is to provide a machine that may be constructed in multiple so that it may have a plurality of means sequentially or simultaneously positioning, clamping, gaging, and correcting a plurality of workpieces or a plurality of places on a workpiece.

These and other objects of the invention will become apparent by reference to the following description of a machine embodying the invention taken in connection with the accompanying drawings, in which.

The machine shown in the drawings has a central work station. Workpieces are positioned and secured in the central work station of the machine. Dual gaging and straightening units are located on either side of the central work station. Each gaging and straightening unit has a rotatable head. The head of each unit rotates about an axis common to both. This common axis is the axis of the machine. The machine axis extends between the heads through the central work station. The workpiece in the central station of the machine has at least one location or point which is positioned and secured relative to the machine axis. The axial alignment of one portion or point of the workpiece relative to one another portion or point of workpiece is found by determining the relationship of each to the machine axis.

A pilot stand in the central work station of the machine positions and secures one portion or point of the workpiece in a known position relative to the machine axis. In the machine shown, the central first portion of the workpiece is positioned and secured with certain points in concentric alignment on the machine axis. Thus the first portion of the workpiece is established on the machine axis. This may be accomplished in the design of the machine relative to the shape and conformation of the workpiece. The central work station of the machine may have adjustable means to locate points on the first portion of the workpiece in any desired known location relative to the axis of the machine. Thus one portion of the workpiece is axially established relative to the machine axis in known relationship.

The ends of the workpiece cantilever or freely project from the central portion of the workpiece towards the heads of the dual units. The ends of the workpiece are the second portions of the workpiece. They are not in known relationship to the axis of the machine. Thus the second portions of the workpiece are in unknown relationship relative to the axis of the machine. This projecting unknown location of the second portions of the workpiece is their actual position and relationship relative to the first portion of the workpiece. It is necessary then to determine whether the actual position of the second portion of the workpiece is concentric on the machine axis or eccentric on the machine axis to determine the axial alignment of the second portion of the workpiece relative to the first portion of the workpiece. A machine unit makes this determination.

Each machine unit has gaging means engaging the second portion of the workpiece in its actual position on the machine axis. The gaging means determine the concentricity or eccentricity of locations or points on the second portion of the workpiece relative to the machine axis. In the event of eccentricity or concentricity the gaging means indicate the ambient condition.

Each machine unit also has straightening means radially positionable at the angle at which the greatest eccentricity occurs. The straightening means are capable of bending the second portion of the workpiece into axial alignment by moving against the workpiece. Thus the machine unit gages and straightens the second portion of the workpiece relative to the machine axis. When the second portion of the workpiece is gaged as being concentric within allowable tolerances on the machine axis, the workpiece is passed. The machine thus determines the axial relationship of two spaced portions of a workpiece by determining each relative to the axis of the machine.

Suitable transfer means load and remove workpieces in the central work station of the machine. The central work station has locating means. Clamps hold the first portion of the workpiece on the locating means to position points on the machine axis. The machine units are moveable toward and away from the workpiece to engage and disengage the workpiece in its clamped position in the central work station. The machine units have heads which are rotatable about the machine axis so as to survey the entire circle of the second portion of the workpiece. The gaging means are on the heads and so may swing a full circle about the second portion of the workpiece in gaging its radial position. The straightening means are also on the head and thus may be located at any radial position relative to the second portion of the workpiece to correct eccentricity from any angle.

The various elements of the machine are power operated and automatically actuated. The machine has an automatic cycle controlling the actuation of the power operated means. The machine is capable of operating continuously in a line of other machines through which a workpiece travels in its stages of fabrication such as from raw material to finished part. In the manufacture of a vehicle rear axle housing, for example, presses in the line form the banjo portion and strip seam welders form the tubular sides of the housing. The tubular sides are welded to the banjo portion. The brake flanges, spring brackets, shock absorber mounts, etc., are welded to the assembly. The faces are formed on the banjo portion to support the differential.

The banjo housing faces locate and support the differential when installed in the banjo housing. The differential has bearings which position the inner ends of the axle drive shafts. The axis of these bearings are relative to the faces on the banjo housing. Their axis may be established by the positions and locations of the faces of the banjo housing.

The axle drive shafts also are bearinged at the wheels. These bearings lie in the outer ends of the tubular portions. Support surfaces are formed in the outer ends of the tubular portions for the outboard bearings. The outboard bearings may be pressed in these surfaces. The probe may gage relative to the surface or the bearing depending on the situation. The housing is thus fabricated and is mechanically ready to be used in assembly with the differential and the axle shafts. But first the axial alignment of the bearing points must be assured so that the axle shafts lying between the differential and the wheels will rotate on an axis, support the wheels to turn in a plane without wobble, and work with the differential without mis-alignment. The housing at this stage of manufacture arrives at the machine embodying the invention.

The machine cycle of the previous part having been completed, the machine cycle activates the transfer means to remove the finished part from the machine. Simultaneously with the removal of the finished part, the transfer means load the next part into the central work station of the machine. The machine then proceeds automatically to establish and gage the housing relative to the machine axis to straighten the housing if necessary, and to then pass the part and repeat the cycle.

Figure 1:
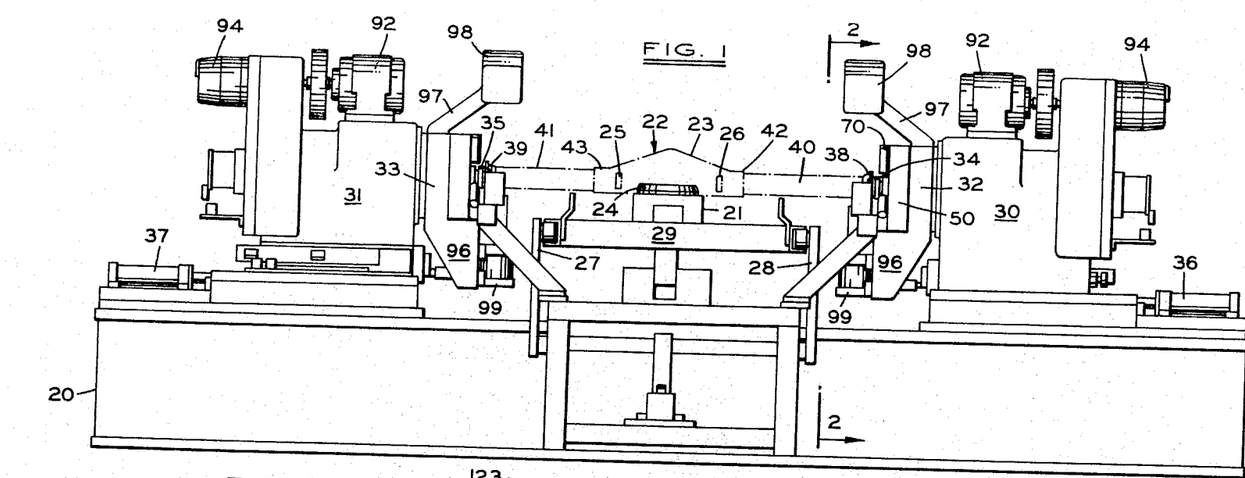
FIG. 1 is a side elevational view of a machine having central positioning and holding means for securing a workpiece at a central portion intermediate its ends and dual gaging and bending units for gaging and correcting the ends of the workpiece extending from the central portion of the workpiece.

More particularly the machine has a base 20. A pilot stand 21 is mounted on the base 20 in the central work station of the machine. The pilot stand 21 supports a workpiece 22 at a surface on the workpiece. The workpiece 22 may be a rear axle housing. A central banjo portion 23 of the workpiece 22 may have a bore. A pilot 24 on the pilot stand 21 lies in the bore of the central portion 23 of the workpiece. The central portion 23 of the workpiece has locations for a pair of bearings 25 and 26. The bearing locations are relative to the surface on which the workpiece is supported. The pilot stand 21 and pilot 24 are adapted to locate the surface with the locations of the bearings concentric on the axis of the machine. Transfer means including walking beams 27 and 28 and a cross member 29 load and unload the workpiece 22 with its central banjo portion 23 on the pilot stand 21. Suitable automatic clamping means align and secure the central banjo portion 23 of the workpiece on the pilot stand 21 and pilot 24. When so mounted and secured, the locations for bearings 25 and 26 in the central banjo portion 23 of the workpiece lie concentric on the machine axis.

A pair of dual machine units 30 and 31 are slidably mounted on opposite ends of the base 20 on either side of the pilot stand 21 and the central work station of the machine. A head 32 is rotatably mounted on the unit 30. A head 33 is rotatably mounted on the unit 31. The heads 32 and 33 define and rotate about the axis of the machine 20. A probe 34 is floatingly carried by the head 32. A probe 35 is floatingly carried by the head 33. A hydraulic cylinder 36 moves the unit 30 on the base 20 to advance and retract the probe 34 relative to the workpiece. A hydraulic cylinder 37 moves the unit 31 on the base 20 to advance and retract the probe 35 relative to the workpiece.

The workpiece 22 has outer ends 38 and 39 at the probes 34 and 35 respectively. The outer ends 38 and 39 of the workpiece have internal bearing surfaces or bearings as the case may be. The probes 34 and 35 engage the internal surface or bearings in the outer ends 38 and 39 of the workpiece respectively. The workpiece has an intermediate tubular portion 40 welded at 42 to the central banjo portion 23 of the workpiece and an intermediate tubular portion 41 welded at 43 to the central portion 23 of the workpiece. The workpiece ends 38 and 39 are welded on the intermediate portions 40 and 41 respectively. The outer ends 38 and 39 of the workpiece 22 are cantilevered in the machine on the projecting intermediate tubular portions 40 and 41 respectively from the central portion 23 of the workpiece on the pilot stand 21.

The bearing points in the workpiece outer ends 38 and 39 must lie concentric on the axis of the workpiece in axial alignment with the points of bearings 25 and 26 in the central banjo portion 23 of the workpiece. However in forming the central banjo portion 23 and welding the tubular portions 40 and 41 thereto it has been found that the points of the bearings usually are not in alignment due to the inaccuracies inherent in manufacturing. In any event, the axial alignment of the four spaced points of the bearings of the workpiece 22 must be checked to insure that they are in axial alignment prior to assembly with the other components of the axle and mounting on a vehicle. This is determined by checking or gaging the axial alignment of the points of the bearings on the axis of the machine. The axis of the machine is defined by the common rotational axis of the heads 32 and 33 projected between one another over the pilot stand 21. In the design of the machine and the workpiece, the machine axis and the workpiece axis are preferably on the same line although it will be understood that they may be on different known lines in known relationship. In the description of the machine embodying the invention, the machine axis and the axis of the workpiece are on the same line.

In the operation of the structure of the machine so far described, the cylinders 36 and 37 withdraw the units 30 and 31 respectively relative to the pilot stand 21 to their retracted positions. The retracted positions of the units 30 and 31 is endwise outwardly of the position shown in FIG. 1. This moves the probes 34 and 35 back from the workpiece location and provides disengagement and room for moving the workpiece. The automatic transfer means actuates the walking beams 27 and 28 and the crossmember 29 and a finished workpiece is removed from the work station of the machine and an unfinished workpiece is placed over the pilot 24 on the pilot stand 21. The automatic clamping means align and secure the workpiece in its work position. The intermediate tubular portions 40 and 41 cantilever the ends 38 and 39 of the workpiece toward the units 30 and 31 respectively.

The cylinders 36 and 37 now move the units 30 and 31 toward the pilot stand 21 advancing the floating probes 34 and 35 toward the outer ends 38 and 39 of the workpiece 22 respectively. The probes 34 and 35 engage the outer ends 38 and 39 respectively. The probes 34 and 35, due to their free floating relationship, assume the position of the points of the bearings of the outer ends 38 and 39 relative to the machine axis and the axis of the workpiece. Thus the position of the probe 34 relative to the axis is indicative of the position of the bearing point in the end 38 relative to the axis. Thus the position of the probe 35 relative to the axis is indicative of the position of the bearing point in the end 39 relative to the axis.

The units 30 and 31 are relatively identical entities adapted for right and left hand positioning and use. The following description of the right hand unit 30 will be understood therefore to be explanatory of the left hand unit 31.

An annular case 50 is mounted on the head 32 and contains means floatingly supporting the probe 34, FIGS. 2, 4, 5, and 6. A trunnion 51 is mounted on the case 50 radially off-set from the axis of the head 32. A beam 52 having opposite ends is pivotally mounted intermediate its ends on the trunnion 51. A counterbalance weight 53 is fixed on one end of the beam 52. The other end of the beam 52 is bifurcated and is equipped with bearings 54 and 55. The bearings pivotally support a pin 56. An arm 57 having opposite ends is pivotally mounted intermediate its ends on the pin 56. One end of the arm 57 has a counterbalance weight 58. The other end of the arm 57 has a sleeve bearing 59. A sleeve 60 is bearinged in the bearing 59. The sleeve 60 is axially slidably held in the bearing 59. A boss 61 is axially slidably positioned in the sleeve and slidably abuts the case 50 at one end of the sleeve 60. A spring 63 is contained in the sleeve 60 and reacts against the boss 61 and urges the plug 62 and sleeve 60 axially outwardly of the bearing 59. A ring 64 on the sleeve 60 limits the outward axial travel of the sleeve 60 as urged by the spring 63. The outer end of the sleeve 60 has an enlarged annular collar 64. A tapered nose 65 extends from the collar 64. The collar 64 and the nose 65 make up the probe 34. The probe 34 is thus axially slidably supported on the sleeve 60. The probe 34 is also supported by the sleeve 60 for angular movement. Both these motions are free so that the probe 34 may resiliently axially engage a workpiece during angular movement of the head 32 and case 50. In the travel of the unit 30 toward the workpiece the axially resilient engagement of the probe 34 with the workpiece assures proper engagement, allows rapid advancing of the unit 30, and prevents bucking engagement between the unit 30 and the workpiece.

Figures 5, 6:
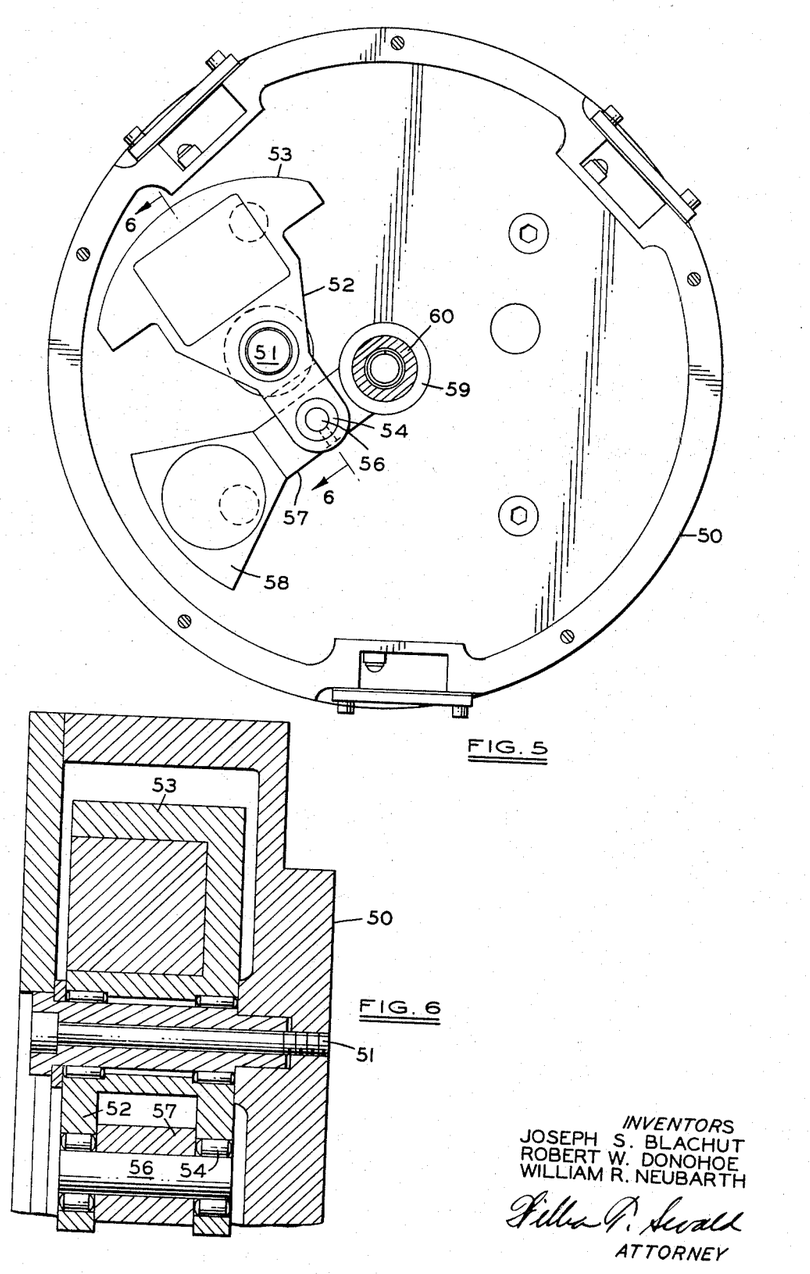
FIG. 5 is a somewhat reduced cross-sectional view of the head showing FIG. 4 taken on the line 5—5 thereof showing the means floatingly and centerlessly supporting the probe.
FIG. 6 is an enlarged cross-sectional view of FIG. 5 showing detail of the pivotal suspension for the probe.

The probe 34 is centerlessly and substantially antigravitationally supported for free movement in a plane by the arm 57 with the weight of the probe assembly on one end of the arm 57 counterbalanced by the counterbalance weight 58 on the other end of the arm 57. This provides free swinging movement of the probe on the arm 57 in one sector. The weight of the probe 34 assembly and arm 57 assembly as pivoted on one end of the beam 52 is counterbalanced by the counterbalance weight 53 on the other end of the beam 52. The swinging motion of the beam 52 on the trunnion 51 is in a sector normal to the swinging sector of the arm 57. The compound swinging of the arm 57 and beam 52 provides universal motion for the probe 34 so that it may move universally relative to the machine axis in a plane. The tapered nose 65 of the probe 34 when moved into engagement with the workpiece cams the probe 34 to the position of the workpiece engaged and thus the probe assumes the actual position of the workpiece relative to the axis of the machine. This position of the probe is measured by the gaging means.

Figure 4:
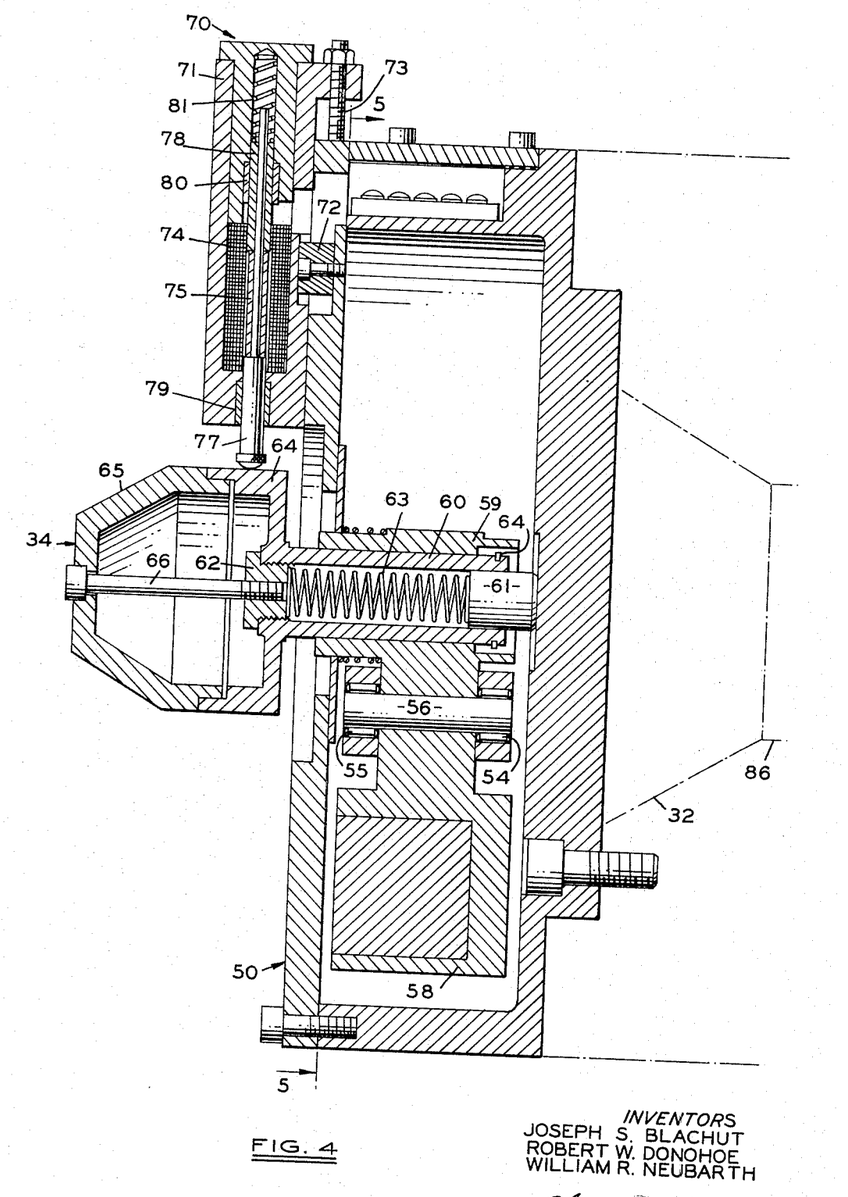
FIG. 4 is an enlarged cross-sectional view of the rotating head, probe, and gaging means shown in the elevation in FIG. 3 at the left side of the figure.

The gaging means are mounted on the case 50 radially of the annular collar 64 of the probe 34. Preferably three triangulated gage assemblies are employed. One is described as exemplary. A gage assembly 70 has a housing 71. The housing 71 is radially aligned on the case 50 relative to the machine axis. A pair of gibs 72 secure the housing 71. A radial adjusting screw 73 provides accurate positioning of the housing 71. A differential transformer transducer field 74 is fixed in the housing 71. A differential transformer transducer core 75 is radially moveably mounted in the housing 71 relative to the field 74. A gage rod 76 supports the core 75. An enlarged foot 77 and an enlarged shoulder 78 fixed on the rod 76 are slidably bearinged in the housing 71 at 79 and 80 respectively. A spring 81 in the housing 71 abuts the shoulder 78 and resiliently urges the foot 77 into contact with the annular collar 64 of the probe 34. The abutting relationship of the foot 77 on the collar 64 positions the core 75 relative to the field 74. The position of the core 75 relative to the field determines and influences the characteristics and magnitude of current flow in the field 74.

With the probe 34 concentric on the machine axis the field 74 emits a normal signal current flow. This may be null. With the probe 34 eccentric and farther away from the gage assembly 70, the spring 81 displaces the core 75 radially inwardly and current flows in the core 74 in one direction indicating the probe position. Conversely with the probe 34 closed to the gage assembly, the foot 77 displaces the core 75 radially outwardly relative to the field 74 and current flows in the field in the opposite direction indicating the probe position. The flow of current, its direction and magnitude as well as the null current condition is measured and indicated by a meter 82. Each gage assembly is similarly constructed and operated.

Figure 3:
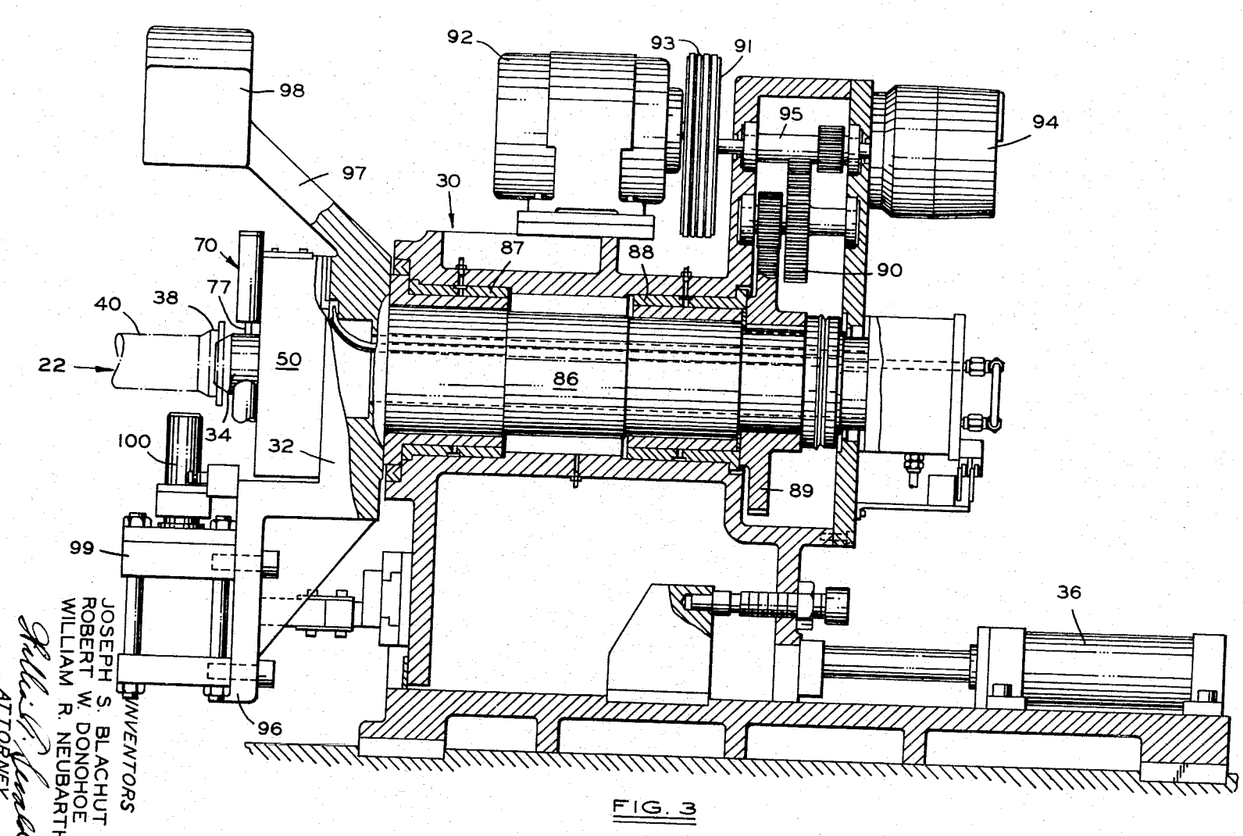
FIG. 3 is a longitudinal cross-sectional view of the unit of the machine shown in FIG. 2, partly in elevation, taken in the line 3—3 thereof.

The head 32 supporting the case 50 is fixed on a horizontal spindle 86. The spindle 86 is bearinged in unit 30 as at 87 and 88. The head 32 and case 50 are thus supported for angular movement about the axis of the spindle 86. This axis is the axis of the machine. Rotation of the spindle 86 rotates the head 32 and the case 50. A gear 89 is fixed on the spindle 86. A gear train 90 drives the gear 89. A pulley 91 drives the gear train 90. A motor 92 and belts 93 drive the pulley 91. A brake 94 on the pulley shaft 95 eliminates coasting of the motor 92 upon shut-off.

Figure 2:
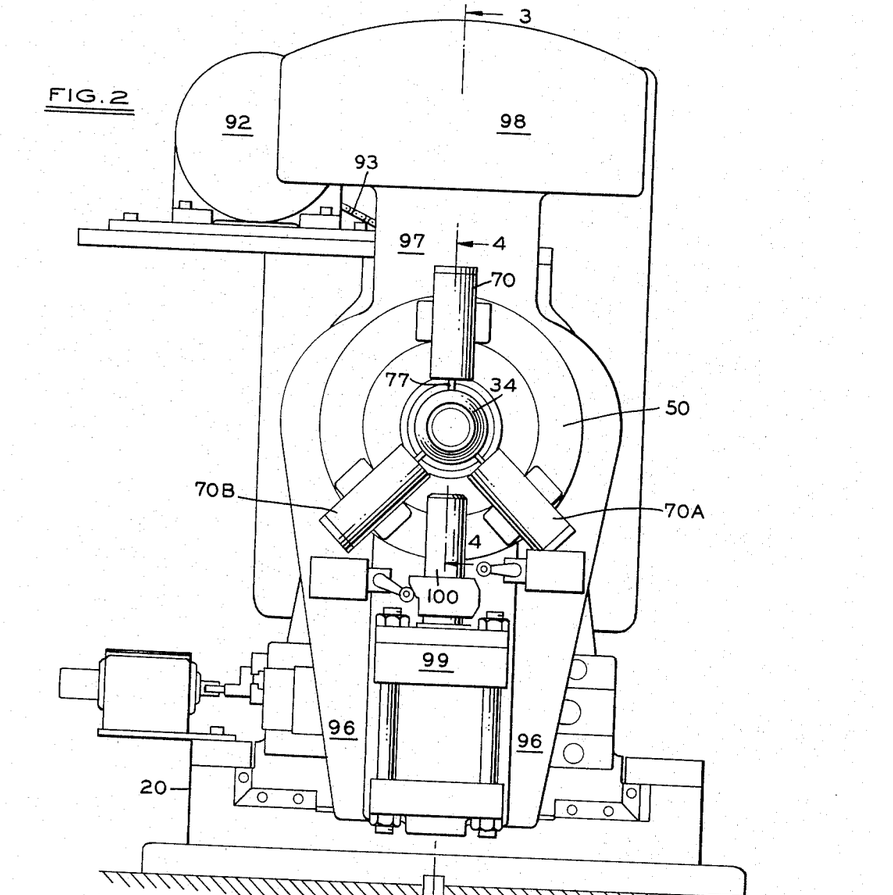
FIG. 2 is an enlarged face elevational view of the right side of the machine shown in FIG. 1 as seen from the position indicated by the line 2—2 of FIG. 1.

An outboard arm 96 on the head 32 is counterbalanced by a diametrically opposite counterbalance arm 97 and counter weight 98. A hydraulic straightening assembly 99 is bolted on the outboard arm 96. A ram 100 is moved radially of the head 32 by the straightening assembly 99 and radially relative to the outer end 38 of the workpiece 22. Rotation of the head 32 and spindle 86 swings the ram 100 angularly about the outer end 38 of the workpiece 22. The ram is therefore radially positionable at any angle relative to the workpiece.

The straightening assembly 99 is located on the head diametrically opposite to the gage assembly 70. As the "low" or radially inward point is diametrically opposite the "high" or radially outward point of an annulus eccentric on an axis, it will be understood that when the probe 34 is eccentric to the machine axis that the probe 34 will have diametrically opposite "high" and "low" points relative to the axis of the machine and any elements established relative to the axis of the machine. Thus when the signal emitted by the gage assembly 70 indicates that it is readily located opposite the low point of the probe 34, the straightening assembly is radially located opposite the high point of the probe 34.

Figure 7:
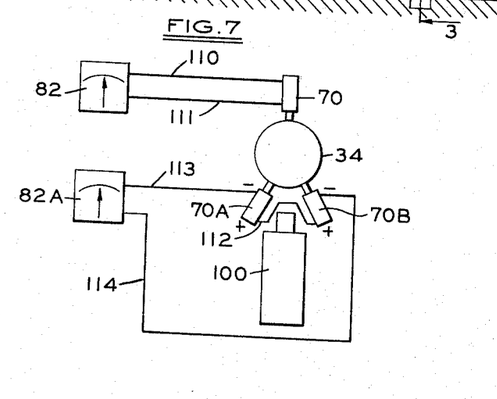
FIG. 7 is a diagrammatic and schematic view showing gage means, meters, probe, and ram relationship.

FIGS. 2 and 7 show the angular position of the gages 70, 70A, and 70B around the probe 34. The output signal voltage of gage 70 is transmitted to the meter 82 by the lines 110 and 111. The gages 70A and 70B are interconnected by a line 112. The output signal voltage of the inter-connected gages 70A and 70B is transmitted to the meter 82A by the lines 113 and 114. Gage 70 is opposite the ram 100 and on the long axis of the ram 100. The gages 70A and 70B are lateral of the long axis of the ram 100. Gage 70 output signal voltage is therefore indicative of the radial position of the probe 34 in line with the long axis of the ram 100.

The output signal voltage of the gages 70A and 70B are added algebraically in indicating the angular position of the probe 34 relative to the long axis of the ram 100. Because of the lateral position of the gages 70A and 70B, their combined signal voltage output is not linear and is sensitive to probe 34 position. This insures adequate gaging relative to the ram 100 being opposite the high point position of the probe 34.

Figure 9:
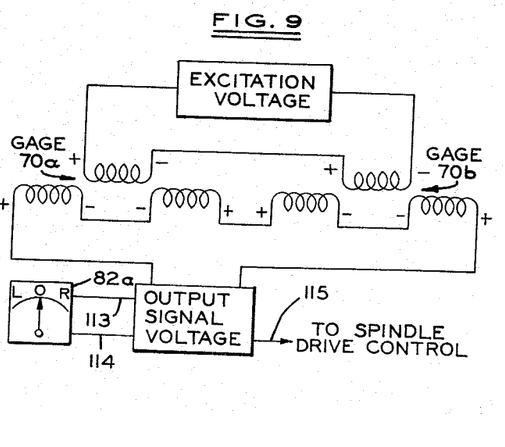
FIG. 9 is a schematic wiring diagram showing a suitable circuit and instrumentation for the gages adjacent the ram.

FIG. 9 shows a suitable circuit for the gages 70A and 70B. A lead 115 communicates the combined output signal voltage to the drive control means actuating the motor 92 in rotating the spindle 86 to swing the head 50 angularly to locate the ram 100 opposite the high point on the probe 34 and the high point on the end 38 of the workpiece.

Figure 8:
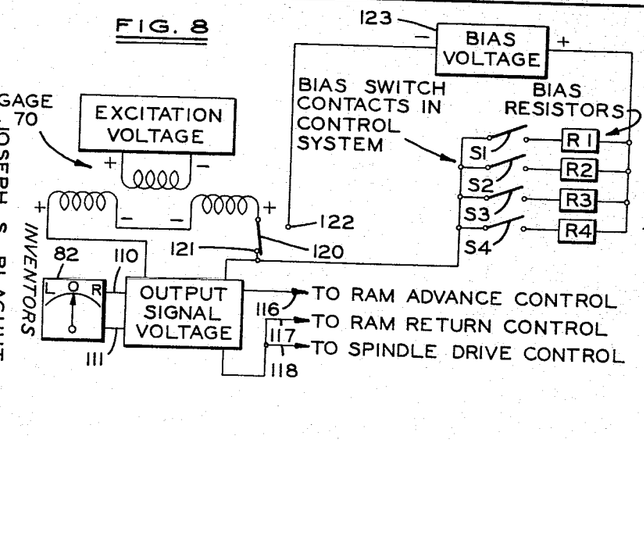
FIG. 8 is a schematic wiring diagram showing a suitable circuit and instrumentation for the gage opposite the ram.

FIG. 8 shows a suitable circuit for the gage 70. The output signal voltage of the gage 70 is communicated to the ram 100 control means for advancing the ram 100 by a lead 116, to the control means for retracting the ram 100 by a lead 117, and to the means controlling spindle rotation by a lead 118.

Relative to the gages 70, 70A, and 70B providing the signal to actuate the control means to rotate the spindle 86, when the part is straight within tolerance, the output signal voltages are in substantial balance, as indicated on the meters 82 and 82A, and after a time delay, the unit 30 is retracted withdrawing the probe 34. However, when the part is not straight within tolerance, the signal voltages of the gages 70, 70A, and 70B are not normal, as indicated on the meters 82 and 82A, and the signal voltages are communicated to the control means actuating rotation of the spindle 86. The indicators of the meters 82 and 82A are indicative of these signal voltages and of these conditions. When a workpiece is straight within tolerance, the output signal voltage of the gages may be considered in balance and no significant change in output signal voltage occurs. The leads communicate no unbalance to the controls with which they communicate and the controls remain inactive.

To properly locate the ram 100 opposite the high point of the workpiece, the gage 70 must be opposite the low point. When the gage 70 is opposite the low point the meter 82 indicates Left of center. The ram only cycles when the meter indicates Left. When the gage 70 is opposite the high point, the meter 82 indicates Right and the ram is not cycle as it is opposite the low point. The Right indicated output voltage signal is used to cause the spindle to rotate off the center line of eccentricity.

In the eccentric position of the probe 34, the line between the high and low points may be considered to be the center line of eccentricity. When the center line of eccentricity lies between the gages 70A and 70B, the center line of eccentricity extends through the ram 100 and the gage 70. This is the desired position for straightening. Also when the center line of eccentricity lies between the gages 70A and 70B, the radial extension of the probe surface from the axis of the machine at the gages 70A and 70B is equal. This effects equal radial extension of the gages 70A and 70B and the algebraically combined signal voltage output is balanced or null.

Conversely when the center line of eccentricity of the probe 34 is not centered between the gages 70A and 70B they are not equally radially extended by the probe 34 and their algebraically combined voltage is one side or the other of zero as indicated on the meter 82A. This signal voltage output when unbalanced is used to cause the spindle 86 to rotate. This signal voltage output when balanced is used to stop rotation of the spindle 86 and/or hold it stationary.

The operation of the system so far described is as follows relative to various conditions of the workpiece being gaged.

(I) *Straight part.*—Both meters 82 and 82A indicate null within tolerance and the output signal voltages of the gages 70, 70A and 70B cause no rotation of the spindle 86. After a time delay the unit is retracted passing the part as straight.

(II) *Part not straight:*

(a) Meter 82A either left or right out of tolerance, meter 82 left, null or right of center. Motor will rotate head in forward direction until meter 82A is null and meter 82 indicates left of center, beyond limit of tolerance. Motor will stop, ram will cycle to straighten part.

(b) Meter 82A null, meter 82 right of center out of tolerance. Motor will rotate head until meter 82A is null and meter 82 indicates left of center out of tolerance. Motor will stop and ram will cycle to straighten part.

(c) Meter 82 indicates left of center. Meter 82A indicates null. Ram will cycle to straighten part.

From the foregoing it will be understood that the condition of IIc obtains by accident in that the part is gaged as being in exactly the correct position for straightening.

Reference is now made to the straightening cycle and ram operation. When the part or workpiece is properly angularly positioned for straightening the meter 82 Left reading indicates the signal voltage output of the gage 70. This signal voltage output is used to actuate the ram. As the voltage output is a function of gage 70 radial displacement radially toward the axis of the machine, when the ram advances and bends the part in the opposite direction, probe 34 is moved radially out at the low point and the gage 70 is corrected and output signal voltage drops to zero or null when the part is at a straight position. This signal voltage output of the gage 70 is used to stop the ram 100. However it has been found that to correct a part it must be bent past center by the ram 100 so as to exceed its elastic limit to provide a permanent corrective set in the part.

Referring to FIG. 8, the switch 120 during the angular positioning of the ram 100 is closed on the pole 121. Upon the ram being properly positioned, the switch 120 closes on pole 122 connecting in bias voltage 123, resistors R1, R2, R3, R4, etc. and normally open switches S1, S2, S3, S4, etc. This provides means for variably increasing bias on the gage 70 requiring additional movement and part displacement before the gage 70 indicates null or zero. The system is so integrated that with each additional actuation of the ram 100, an additional switch S1 to S4 is closed connecting in an additional resistor R1 to R4 increasing the bias on the gage 70.

The straightening cycle will take place as follows:

The control system causes the ram to advance, bending the part, until meter 82 bias is overcome and the meter 82 indicates to the right the increment of tolerance beyond the center line of the meter.

The ram reverses direction. If the elastic limit of the part has been exceeded and the part is straight within the tolerance, the ram will return to its rest position and the head will return and the bias voltage is dropped out.

If the part is not straight, meter 82 will again indicate left of center, outside the tolerance. An added bias voltage is applied to gage 70, of a direction and magnitude to cause meter 82 to indicate to the left two (or more) increments of the tolerance.

The ram advances again, bending the part two (or more) increments of tolerance beyond the center line of the fixture, until meter 82 indicates (1) increment of tolerance to the right of center after the bias is removed.

The ram reverses direction again. The bias voltage is removed from gage 70 as the ram returns, so that meter 82 will give a true indication.

If the part is not within tolerance, meter 82 will again indicate left of center, as the ram returns. An added increment of bias voltage is applied to gage 70.

The ram again advances, bending the part three or more added increments of tolerance beyond the center line of the fixture, until meter 82 indicates one increment of tolerance to the right of center after the bias is removed.

The ram reverses direction, the bias voltage is removed from gage 70, and the part is gaged again.

Steps 1, 2, 3, 4, above are repeated through 12 successive thrusts of the ram as in the actual commercial embodiment if necessary, until the part is straight.

When gage 70 indicates the part is straight with meter 82 not indicating left of center beyond tolerance, the ram will return to its rest position and trip a switch.

At this time, the gages recheck the part.

In the event the part has been over-straightened (bent too far) or has been deflected laterally relative to the ram, the gages will signal the control system to rotate the head to a new "high" and repeat the straightening cycle.

The requirement of the machine is to not pass any part not straight within the tolerance, although a provision has been designed to stop the process and signal an operator after an adjustable number of re-cycle operations have occurred.

The machine control system monitors the signal of the gage assembly 70. The control system is responsive to the signal direction and magnitude to radially locate the head 32 with the gage assembly 70 at the low point of the probe. If the quantitative signal is of a value within the tolerance pre-set, the workpiece is evaluated by the machine as being in acceptable axial alignment and the workpiece is passed.

In the event the quantitative signal is of a value outside the tolerance pre-set, the workpiece is evaluated as not being in acceptable axial alignment and retained for straightening into acceptable axial alignment. The workpiece is straightened by actuating the straightening assembly 99 to advance the ram 100 radially against the high point of the workpiece so as to force the high point toward the low point a sufficient distance to exceed the elastic limit of the workpiece to impart a permanent corrective set in the workpiece. The workpiece may be corrected by a single advance of the ram 100 or it may require several advances as will be better understood from the following description of the operation of the machine.

In operation, the transfer means walking beams 27 and 28 and the cross member 29 are actuated by the automatic cycle of the machine. They move a known axially aligned part out of the machine down-stream to the next machine in line. At the same time they move a new workpiece into the work station of the machine. This workpiece is of unknown axial alignment. The transfer means deposit the new workpiece on the pilot stand 21 over the pilot 24. The clamping means are then actuated and the central banjo portion 23 is secured in position with the points of the central bearings 25 and 26 aligned concentric on the axis of the machine. The intermediate tubular portions 40 and 41 cantilever out from the central banjo portion 23 along the axis of the machine locating the outer ends 38 and 39 of the workpiece in their actual position relative to the axis of the machine.

The machine cycle then actuates the hydraulic cylinders 36 and 37 and the machine units 30 and 31 are moved toward the central work station of the machine. This carries the probes 34 and 35 into contact with the outer ends 38 and 39 respectively of the workpiece. The tapered nose 65 of each probe enters the outer ends 38 and 39 of the workpiece and the swing beam 52 and pivot arm 57 cross-pivotally supporting the probles allow the probes to move universally in a plane and assume the actual axial position of the outer ends 38 and 39 of the workpiece relative to the axis of the machine. The axial resilient abutment of the probes 34 and 35 against the spring 63 urges the probes 34 and 35 axially into forced engagement with the outer ends 38 and 39 of the workpiece. The workpiece 22 now may be checked for axial alignment of the bearing points in the outer ends 38 and 39 relative to the points of its central bearings 25 and 26. The probes 34 and 35 have assumed the actual position of the outer ends 38 and 39. In assuming the actual position of the outer ends 38 and 39, the probes have moved more or less relative to the gages 70, 70A, and 70B. The gages emit signals indicative of their measurement. The action of the machine unit 30 is now described as illustrative of both units 30 and 31.

Due to the spaced angular positions of the gage assemblies 70, 70A, and 70B, when the probe 34 is eccentric on the axis, the high and low points on the annular collar 64 vary the position of at least one gage rod foot 77 and transformer core 75, relative to the transformer field 74. This causes at least one field to emit a signal other than normal. These signals are indicated on the meters 82 and 82A, and fed to the signal evaluation system monitoring the signals.

In the event that the actual position of the outer end 38 of the workpiece 22 locates the probe 34 concentric on the machine axis within acceptable tolerance, the probe 34 is projected substantially equally radially on the machine axis and no high and low points obtain. Thus no gage rod foot 77 moves a core 75 relative to the field 74. The signal emitting from each field is thus constant, such as zero on the meters 82 and 82A under this condition. This is indicative of the end 38 lying concentric on the machine axis. The signal is monitored by the signal evaluating means of the machine and the controls are signaled to withdrawn the unit 30 thus passing the workpiece. It is now known that the bearing point in the end 38 is in proper axial alignment with the bearing point 26 in the central banjo portion 23 of the workpiece 22. Since the workpiece does not require straightening, this terminates the action of the unit reltaive to the workpiece 22.

However, in the event that the actual position of the outer end 38 of the workpiece 22 is eccentric on the machine axis, it locates the probe 34 eccentric on the machine axis. Thus high and low points obtain on the probe 34 reltaive to the machine axis. The workpiece requires straightening. In riding over the eccentric position of the annular collar 64 of the probe 34, the gage rod foot 77 moves radially of the machine axis as it encounters the high and low points of the probe 34. This occurs as the spindle 86 rotates the head 32 and case 50 on which the gage assembly 70 is mounted. The gage rod foot 77 moves radially relative to the high and low points on the probe 34 and thus it moves the core 75 relative to the field 74. The field 74 emits a signal responsive to the relative position of the core 75 and this signal is indicated on the meter 82. The system is so organized that when the gage rod foot 77 is at high point on the probe 34, the meter 82 indicates right of center. This indication is used by the system to continue the rotation of the spindle, as the ram 100 is opposite the low point. When the meter 82 indicates left of center, the gage rod foot 77 is at the low point on the probe 34 and this desirably locates the ram 100 at the high point of the probe 34. This signal is used to actuate the ram 100. The straightening assembly 99 moves the ram against the workpiece outer end 38 and the ram movement is controlled in travel to bend the workpiece beyond its elastic limit to make the estimated necessary correction.

In the event that the second gaging indicates that there is still eccentricity, the workpiece is not passed. Instead the monitoring system is again actuated and the ram 100 relocated at the zenith or apex of the workpiece. At this point an additive bias signal is imposed on the signal controlling ram 100 travel and the ram is then travelled a farther distance toward the workpiece to bend the workpiece farther past its elastic limit. The workpiece may be gaged several times and with each added gaging, the ram corrective travel is increased. In the commercial embodiment of the machine in actual production use, there is a provision in the system for twelve repetitive gagings and corrections whereupon if the part still indicates eccentricity, it is rejected. Usually however, after a few gagings and corrections, the next gaging indicates workpiece concentricity and the part is passed.

The operation of the left hand unit 31 of the machine is the same as the operation of the right hand unit 30 hereinbefore described. In the dual unit 30 and 31 operation of the machine, upon one unit 30 or 31 gaging the adjacent end of the workpiece as being in axial alignment, it withdraws and stands idle until the opposite unit has passed the workpiece. Thus the gaging and correcting of the adjacent ends of the workpiece by the units 30 and 31 is coordinated in the control system of the machine.

While the ram 100 has been described as moving radially toward the workpiece to make the necessary bending correction in the workpiece, it will be understood that the disposition of the gages and the rams may be reversely organized and the ram make its correction movement relative to the workpiece by moving radially outwardly. In this connection a stirrup on the end of the ram may engage the opposite side of the workpiece and pull it toward the ram.

It will be understood that the gage means and system may be integrated as desired with the ram and gage means both radially located on the head 33 at the same angle so that the indication of the gage as a high point may be communicated to the system as an indication of the proper positoining of the ram for corrective movement.

While a dual machine has been shown with the center portion of the workpiece clamped in known axial relationship relative to the axis of the machine, it is obvious that the machine may be constructed with a single unit and the workpiece project one portion towards the single unit from the work station.

It will be understood that workpieces other than axle housings may be gaged in and straightened by the machine and process of the invention. Drive shafts, crank shafts, cam shafts, frames and workpieces in general may be gaged and straightened by the machine within the capability of a workman having ordinary skill in the art. While the axis of the workpiece has been shown and described in conjunction with the axle housing as being concentric on the axis of the machine or lying on the same line, it is obvious that the axis of the workpiece and the axis of the machine may lie on different lines provided the line of the workpiece axis and the line of the machine axis are in known relationship.

From the foregoing description and from the exemplary machine of the drawings it will be understood that the machine may be constructed to provide means for establishing a known axis and means for reading, measuring and evaluating the variation of conformance of the workpiece relative thereto within the purview of the invention.

While only a single embodiment of the invention has been shown and described in detail, it is obvious that many changes may be made in the size, shape, detail, and arrangement of the various elements of the invention within the scope of the appended claims.

We claim:
1. A machine for checking two spaced portions of a workpiece for axial alignment relative to one another by gaging them relative to an axis established by the machine and in the event of proper alignment passing the workpiece and in the event of improper alignment straightening the workpiece into proper alignment and then passing the workpiece, comprising a work station on the machine for positioning and holding a first portion of the workpiece;

a measuring head on the machine spaced from said station for engaging a second portion of the workpiece;

said work station and measuring head defining a machine axis; said machine checking the axial alignment of the workpiece relative to the machine axis;

said work station holding the first portion of the workpiece shown in a known relationship to the machine axis such as concentric thereon with the second portion of the workpiece freely cantilevered from the first portion of the workpiece relative to the machine axis to a point of engagement with said measuring head to allow the workpiece to present the second portion of the workpiece to the measuring head in its actual axial relationship relative to the first portion of the workpiece and to the axis of the machine at said measuring head;

the axial alignment of the second portion of the workpiece relative to the first portion of the workpiece being measured by said measuring head by measuring the axial alignment of the second portion of the workpiece relative to the axis of the machine;

said measuring head including a probe for engaging the second portion of the workpiece, support means floatingly suspending said probe to allow said probe to assume the actual axial position of the second portion of the workpiece, and gage means engaging said probe productive of a signal as a measure of the position of the second portion of the workpiece;

said gage means producing a normal signal indicative of the proper axial alignment of the second portion of the workpiece to pass the workpiece and a signal different from normal indicative of improper axial alignment of the second portion of the workpiece including the position at which the point of maximum outward variation from axial occurs, and straightening means responsive to a signal different from normal angularly positionable on signal at the point of maximum variation from axial of the second portion of the workpiece and capable of forcing the second portion of the workpiece into axial alignment by correctively bending the workpiece;

said signal means passing the workpiece upon said second portion of the workpiece lying axial relative to the first portion of the workpiece after straightening by producing the normal signal.

2. A machine for checking a workpiece at two locations for axial alignment, passing the workpiece if properly aligned, straightening the workpiece if not properly aligned into proper alignment, and then passing the workpiece, comprising a work station for holding a first portion of the workpiece;

a measuring head for engaging a second portion of the workpiece;

said work station and measuring head defining a machine axis; said machine checking the axial alignment of the workpiece relative to the machine axis;

said work station holding the first portion of the workpiece in a known position relative to the machine axis such as concentrically therewith;

said work station holding the workpiece with the second portion of the workpiece freely cantilevering from said first portion of the workpiece along the machine axis so as to position the second portion of the workpiece relative to the machine axis in its actual axial relationship relative to the first portion of the workpiece;

the axial relationship of the second portion of the workpiece relative to the machine axis indicating the axial relationship of the second portion of the workpiece relative to the first portion of the workpiece;

said measuring head having a freely floating probe for engaging the second portion of the workpiece in its actual axial position;

signal means engaging said probe as the indicator of the axial relationship of the second portion of the workpiece relative to the first portion of the workpiece;

said signal means producing a normal output signal when said second portion of the workpiece locates said probe concentric on said machine axis;

said signal means producing a signal output other than normal when said second portion of the workpiece locates said probe eccentric of said machine axis including a signal indicative of the location at which maximum variation from normal concentricity occurs;

signal evaluation means reading said signal output of said signal means adapted to pass a workpiece when said output signal is normal;

angularly moveable straightening means on said head for bending the second portion of the workpiece into axial alignment when said signal evaluation means receives a signal other than normal;

said signal evaluation means angularly locating said straightening means at the position of greatest variation to axial of the second portion of the workpiece by locating and straightening means responsively to signal;

said straightening means permanently deflecting the second portion of the workpiece radially at the angle at which the maximum variation from normal concentricity occurs into axial alignment with the first portion of the workpiece.

3. A machine determining the axial relationship of two spaced portions of a workpiece and in the event of proper alignment passing the workpiece and in the event of improper alignment bending the workpiece into proper alignment and then passing the workpiece, comprising a station for holding a first portion of the workpiece with the axis of the workpiece at the first portion of the workpiece in known proper alignment with the axis of the machine, securing means such as clamps at said station for holding the first portion of the workpiece against forced displacement, a measuring head spaced from said station defining a machine axis with said station;

a second portion of the workpiece being freely cantilevered from the first portion along said machine axis to said head, deviation of the second portion of the workpiece from alignment with the machine axis indicating like deviation from axial alignment with the first portion of the workpiece, a floating probe on said head for engaging the second portion of the workpiece in its cantilevered position; and means floatingly supporting said probe;

said probe in engaging the second portion of the workpiece assuming the actual axial position of the second portion of the workpiece as an indication of the axial position of the second portion of the workpiece relative to the machine axis and the relative axial alignment between the second and first portions of the workpiece;

said means floatingly supporting said probe including a trunion on said head, a beam having opposite ends pivoted intermediate its ends on said trunion, a counter balanced weight on one end of said beam, counter balance weight on one end of said beam, an arm having opposite ends pivoted on the other end of said beam intermediate its ends, a counter balanced weight on one end of said arm; the other end of said arm supporting said probe;

said beam and arm being transversely positioned relative to one another so that their compound pivotal movement allows said probe to move universally in a plane;

said counterbalance weight on said arm off-setting the weight of said probe, said counterbalance weight on said beam offsetting the weight of said probe, arm, and said counterbalance weight on said arm.

4. A machine determining the axial relationship of two spaced portions of a workpiece and in the event of proper alignment passing the workpiece and in the event of improper alignment bending the workpiece into proper alignment and then passing the workpiece, comprising
- a station for holding a first portion of the workpiece with the axis of the workpiece at the first portion of the workpiece in known proper alignment with the axis of the machine,
- securing means such as clamps at said station for holding the first portion of the workpiece against forced displacement,
- a measuring head spaced from said station defining a machine axis with said station;
- the second portion of the workpiece being freely cantilevered from the first portion along said machine axis to said head,
- deviation of the second portion of the workpiece from axial alignment with the machine axis indicating like deviation from axial alignment with the first portion of the workpiece,
- a floating probe on said head for engaging the second portion of the workpiece in its cantilevered position; and
- means floatingly supporting said probe;
- said probe in engaging the second portion of the workpiece assuming the axial position of the second portion of the workpiece as an indication of the axial position of the second portion of the workpiece relative to the machine axis and the relative axial alignment between the second and first portions of the workpiece;
- and means for measuring the axial position of said probe including three differential transformer transducers suitably positioned on said head relative to one another such as triangularly;
- each said differential transformer transducer comprising a field fixed to said head, a core radially movable relative to said field, a gage rod on each said core contacting said probe, and a spring displaceably urging each said gage rod into contact with said probe;
- each said differential transformer transducer emitting a normal signal when said probe is axially located concentrically within a given tolerance and emitting a signal other than normal when said probe is located eccentrically due to the displacement of said core relative to said field by the eccentric position of said probe,
- each said differential transformer transducer emitting a signal proportional in magitude to the distance of displacement of said core relative to said field to provide indication of the magnitude of the eccentricity of said probe as positioned by the second portion of the workpiece.

5. In a machine as set forth in claim 4, one said differential transformer signal emission being directional to produce current flow depending on which side of normal position said probe lies to indicate locations of axial inward eccentricity and locations of axial outward eccentricity; one said direction of flow indicating an inward location of eccentricity, the other said direction of flow indicating an outward location of eccentricity, and means measuring and indicating the flow direction to indicate inward and outward locations of eccentricity.

6. In a machine as set forth in claim 5, means rotatably mounting said head for angularly moving said head about said machine axis and said probe;
- all said transducers angularly moving with said head with each said gage rod riding said probe in its floating axial position;
- said gage rod in riding said probe moving said core relative to said field producing signal magnitudes indicative of the axial relationship of the engaged location on said probe at said gage rod;
- said means reading and indicating said signal output direction and magnitude so as to indicate the angular position of the greatest inward and outward eccentric locations on said probe.

7. In a machine as set forth in claim 6, a ram on said head in known angular relationship to said transducer such as in a position at zero and 180 degrees;
- said ram being radially movable with said head relative to the machine axis and adapted to engage the second portion of the workpiece to move the second portion of the workpiece radially with sufficient force to bend the workpiece;
- said ram being accurately positionable relative to a location of greatest eccentricity of the second portion of the workpiece by rotating said head and reading said meter to engage the second portion of the workpiece thereat and to move it in a direction opposite to eccentric position to correct the second portion of the workpiece to concentric relationship relative to the first portion of the workpiece.

8. Means for finding the center line of the eccentricity of a body off-center on an axis wherein the center line of eccentricity lies between the high and low points and wherein locations on the body equally spaced from the center line at the sides of the center line lie equally relative to the axis comprising
- a head defining an axis,
- a pair of electrical gages spaced on said head lying at an angle to one another and radially of said axis,
- said gages having an output signal voltage responsive to the radial positioning of the gages by a body being measured,
- a circuit algebraically combining the output signal voltages of said gages so that when said gages are equally positioned by a body their output signal voltages balance with center line of eccentricity between them and when said gages are not equally positioned by a body their signal voltage unbalance with the center line of eccentricity not between them, and
- means measuring the signal voltage of said circuit as an indication of the location of the center line of eccentricity of a body relative to said gages.

9. In a device as set forth in claim 8, means for rotating one said head and a body on said axis for locating the center line of eccentricity between said gages.

10. In a device as set forth in claim 8,
- a third electrical gage lying radially of said axis on a diameter of said axis midway between said paired electrical gages,
- said third electrical gage having an output signal voltage responsive to its radial positioning by a body being measured,
- said third gage output signal voltage being null when in contact with a portion of a body concentric on said axis, of one character when in contact with a low point on a body, and of a different character when in contact with a high point on a body, and
- means measuring the output signal voltage of said third gage as an indication of the relative position of the high and low points of the center line of eccentricity of said body when located between said paired gages.

References Cited

UNITED STATES PATENTS

| | | | |
|---|---|---|---|
| 2,682,710 | 7/1954 | Crosby | 33—181 |
| 3,208,250 | 9/1965 | Fournier | 72—81 |

CHARLES W. LANHAM, *Primary Examiner.*

R. D. GREFE, *Assistant Examiner.*